(12) United States Patent
Grizzle

(10) Patent No.: US 8,371,325 B1
(45) Date of Patent: Feb. 12, 2013

(54) SOIL MOISTURE RESPONSIVE IRRIGATION FLOW CONTROL VALVE

(75) Inventor: Glendale Grizzle, Murrieta, CA (US)

(73) Assignee: Hunter Industries, Inc., San Marcos, CA (US)

( * ) Notice: Subject to any disclaimer, the term of this patent is extended or adjusted under 35 U.S.C. 154(b) by 431 days.

(21) Appl. No.: 12/693,342

(22) Filed: Jan. 25, 2010

(51) Int. Cl.
  *F16K 31/12* (2006.01)
(52) U.S. Cl. ............... 137/78.3; 47/48.5; 47/79
(58) Field of Classification Search .............. 137/78.2, 137/78.3, 78.5; 47/48.5, 79
  See application file for complete search history.

(56) References Cited

U.S. PATENT DOCUMENTS

| | | | |
|---|---|---|---|
| 2,674,490 A | 4/1954 | Richards | 299/25 |
| 3,204,872 A | 9/1965 | Whear | 239/63 |
| 3,874,590 A * | 4/1975 | Gibson | 239/63 |
| 3,898,843 A | 8/1975 | Waterston | 61/13 |
| 4,095,458 A | 6/1978 | Wild | 73/73 |
| 4,182,357 A | 1/1980 | Ornstein | 137/1 |
| 4,648,555 A | 3/1987 | Gumbmann | 239/63 |
| 4,696,319 A | 9/1987 | Gant | 137/78.3 |
| 4,739,789 A * | 4/1988 | Hamilton | 137/78.2 |
| 6,570,109 B2 | 5/2003 | Klinefelter et al. | 200/61.04 |

* cited by examiner

*Primary Examiner* — Craig Schneider
(74) *Attorney, Agent, or Firm* — Michael H. Jester

(57) ABSTRACT

A housing has at least one port for allowing entry of subterranean water into an interior of the housing when the housing is buried in soil. The housing has an inlet fitting configured to be coupled to drip tubing and an outlet for discharging water conveyed from a pressurized water source conveyed through the tubing. A valve includes a valve member that is movable to open and close a fluid communication path between the inlet fitting and the outlet. A hygroscopic member is positioned in the interior of the housing and is capable of absorbing subterranean water and expanding to move the valve member to close the fluid communication path. A spring element is positioned to bias the valve member to open the fluid communication path.

20 Claims, 6 Drawing Sheets

SOIL MOISTURE RESPONSIVE IRRIGATION FLOW CONTROL VALVE

FIELD OF THE INVENTION

The present invention relates to valves used in irrigation systems for irrigating residential and commercial landscaping.

BACKGROUND OF THE INVENTION

Many parts of the United States have insufficient rain fall during portions of the year to support healthy landscape vegetation. Rotor-type sprinklers, rotary stream sprinklers and spray-type sprinklers are therefore frequently employed to water turf and plants associated with residences, apartments, and playing fields. Water shortages have led many states and municipalities, and more recently the EPA, to promulgate and/or impose landscape watering restrictions to conserve water. Efforts have therefore been made by companies in the irrigation industry to design more water efficient sprinklers and water conserving electronic irrigation controllers. The latter frequently use rain sensors, and in some cases, watering schedules that are altered based on evapotranspiration (ET) data. One way to conserve water when irrigating plants and shrubs is to employ so-called micro-irrigation systems, such as drip irrigation. Water is delivered at very low flow volumes to drip emitters and micro-spray nozzles placed closely adjacent to plants, shrubs and trees. This eliminates most of the water waste primarily associated with spray-type sprinklers that deliver water at high flow volume rates and produce significant water run-off and wind-blown mist.

When drip irrigation is utilized, plants often receive more water than is necessary to maintain their health. This is because homeowners and landscape maintenance personnel have very limited visual feedback about the amount of water that is being delivered. Water that seeps into the surrounding soil often penetrates deeply below the roots of the plants. Sometimes the soil around the plants already has sufficient moisture to maintain plant health or only a minimal amount of water is needed that is less than that provided by the watering program executed by the irrigation controller. Excess water is often absorbed by the soil, and there is no visible puddling or run-off. By way of example, a landscape area with several hundred drip emitters running at two gallons per hour can easily waste hundreds of gallons of water in one cycle of a watering program executed by an irrigation controller.

SUMMARY OF THE INVENTION

In accordance with the present invention, a soil moisture responsive irrigation flow control valve includes a housing having at least one port for allowing entry of subterranean water into an interior of the housing when the housing is buried in soil. The housing has an inlet fitting configured to be coupled to drip tubing and an outlet for discharging water conveyed from a pressurized water source conveyed through the tubing. A valve includes a valve member that is movable to open and close a fluid communication path between the inlet fitting and the outlet fitting. A hygroscopic member is positioned in the interior of the housing and is capable of absorbing subterranean water and expanding to move the valve member to close the fluid communication path. A spring element is positioned to bias the valve member to open the fluid communication path.

BRIEF DESCRIPTION OF THE DRAWINGS

Throughout the drawing figures like reference numerals refer to like parts.

DETAILED DESCRIPTION

Figure 1:
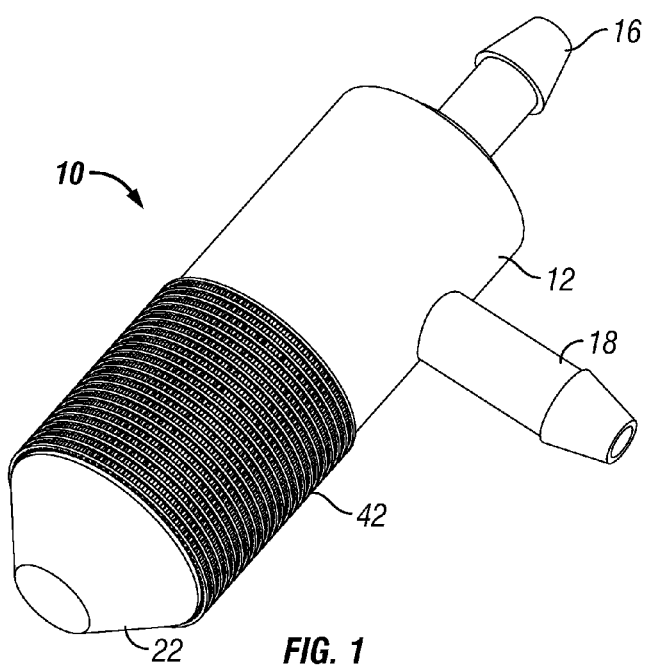
FIG. 1 is an enlarged isometric view of a soil moisture responsive irrigation flow control valve in accordance with an embodiment of the present invention.

Referring to FIGS. 1-4, a soil moisture responsive irrigation flow control valve 10 includes an elongate cylindrical housing 12 having a plurality of ports 14 formed in the side wall of the housing 12 for allowing entry of subterranean water into an interior of the housing when the housing 12 is buried in soil in a landscaped area. Unless otherwise indicated, all of the parts of the flow control valve 10 can be injection molded of suitable plastic. The ports 14 have a square shape and are arranged in uniform rows and columns that are equally circumferentially and axially spaced around roughly the lower half of the housing 12. The flow control valve 10 has an water inlet in the form of an axially extending barbed inlet fitting 16 configured to be coupled to a first segment of conventional plastic drip tubing (not illustrated) that conveys water from a pressurized water source through the first segment of tubing to the flow control valve 10. The housing 12 has a water outlet in the form of a radially extending barbed outlet fitting 18 configured to be coupled to a second segment of conventional plastic drip tubing (not illustrated) that leads to the area to be irrigated. Optionally, this tubing may have a conventional drip emitter or micro-spray nozzle (not illustrated) coupled to the other end of the second segment of drip tubing and located for discharging water adjacent plants, shrubs or a tree. The barbed inlet fitting 16 is integrally formed as part of an upper end cap 20 that is attached to the upper end of the cylindrical housing 12. The upper end cap 20 has a smaller diameter cylindrical portion 20a (FIG. 3) and an upper disc portion 20b that forms a flange that provides a seat to engage the upper shoulder 12a at the upper end of the housing 12. The barbed outlet fitting 18 is integrally formed on the side of the housing 12. The housing 12 need not have an outlet fitting but could simply have an outlet orifice for allowing water to be directly delivered into the soil where the flow control valve 10 is buried closely adjacent to the plants, shrubs or trees that are to be watered. A frusto-conical lower end cap 22 fits snugly into the lower end of the cylindrical housing 12. The lower end cap 22 may be elongated and may be formed as a stake (not illustrated) to simplify installation into the landscape, and to provide additional support to the valve when it is installed in the ground.

A valve member in the form of a cylindrical metal pin 24 is movable to open and close the fluid communication path that extends between the inlet fitting 16 and the outlet fitting 18. The pin 24 slides up and down inside the axial bore 26 (FIGS. 3 and 4) of a cylindrical valve seat 28. The pin 24 is an extension of a metal guide shaft 30 which has a slightly larger diameter. The lower end of the guide shaft 30 reciprocates in an axial guide bore 32 formed in the lower end cap 22. A cylindrical piston 34 is securely fixed around the lower segment of the pin 24. A synthetic rubber O-ring 36 is seated in an annular groove in the outer surface of the piston 34 and provides a seal between the piston 34 and the interior wall of the housing 12.

A cylindrical hygroscopic member 38 (FIGS. 2-4) is positioned in the interior of the housing 12 and is capable of absorbing subterranean water that enters through the ports 14. The hygroscopic member 38 expands to move the pin 24 to close the fluid communication path between the inlet fitting 16 and the outlet fitting 18. The hygroscopic member 38 comprises a stack of individual discs 38a (FIG. 2) with holes in the centers thereof so that they can be slid over the guide shaft 30 for easily assembling them into the cylindrical hygroscopic member 38. The hygroscopic discs 38a are preferably made of a substantially non-biodegradable hygroscopic material such as latent cure nitrile butadiene rubber binder and reinforced cellulose fiber, commercially available in the United States as N-8090 Syntheseal® gasket material F724900E49M6. This hygroscopic material resists de-composition when buried in the soil where it is subject to organic materials, fertilizers, and microbes carried by the subterranean water that enters the ports 14 in the housing 14 before being absorbed by the hygroscopic member 38.

Figure 3:
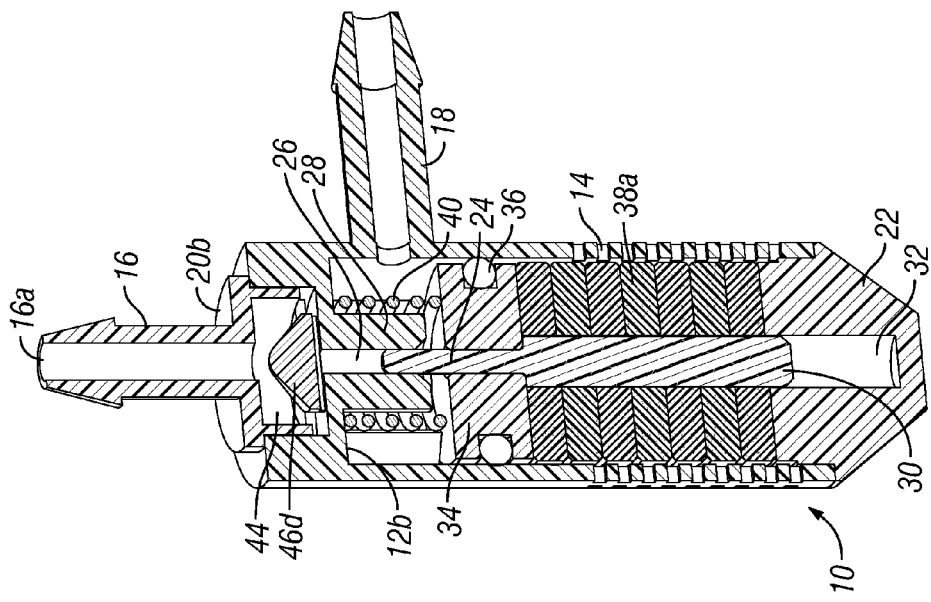
FIG. 3 is a vertical sectional view of the flow control valve of FIG. 1 in its open state.

A spring element in the form of a coil steel spring 40 is positioned inside the housing 12 to bias the pin 24 to open the fluid communication path that includes the bore 26 as illustrated in FIG. 3. The upper segment of the spring 40 surrounds and engages the outer surface valve seat 28. The coil spring 40 is compressed between the underside 12b of the housing 12 and the upper side of the piston 34. The coil spring 40 keeps the valve open when moisture is not present in the hygroscopic member 38. This also helps to make the valve open in the event the filter screen 42 is contaminated and moisture from the soil is not allowed to reach the hygroscopic member 38. In this occurrence, the valves fails in a normally open condition to allow irrigation for the vegetation to continue as if the soil moisture responsive irrigation flow control valve 10 were not present. When the flow control valve 10 is buried and there is excess moisture in the soil, subterranean water seeps into the interior of the housing 12 via ports 14. These ports are preferably covered by a cylindrical filter screen 42 (FIG. 2) that surrounds the housing 12. The filter screen 42 may be made of fine mesh stainless steel screen material or fine mesh plastic screen material. The filter screen 42 may be optionally left off the flow control valve 10 if the ports 14 are manufactured small enough to protect the hygroscopic member 38.

Figure 4:
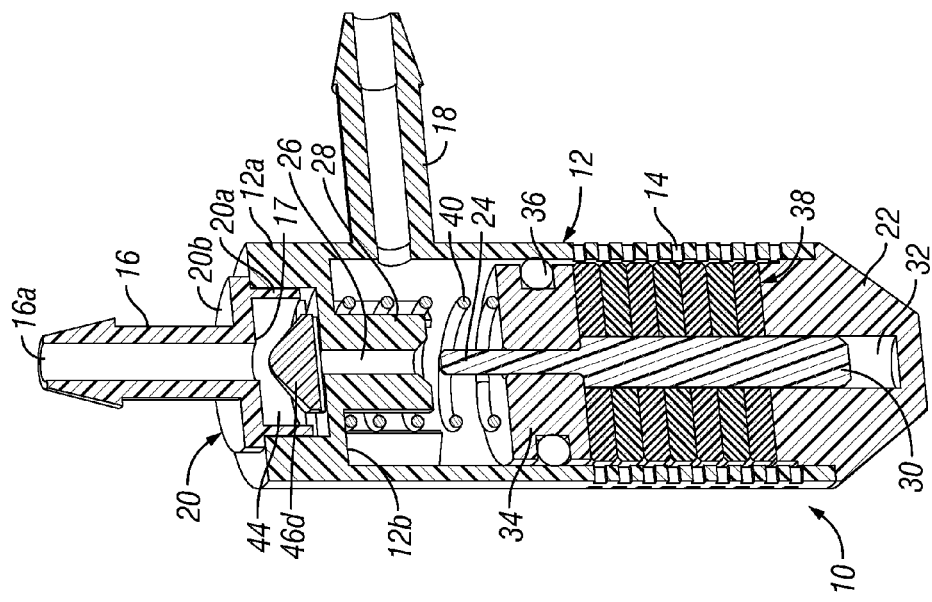
FIG. 4 is a vertical sectional view of the flow control valve of FIG. 1 in its closed state.

The subterranean water that enters the housing 12 is absorbed by the hygroscopic discs 38a that expand. The cumulative expansion of the plurality of discs 38a results in a substantial increase in the overall axial length of the hygroscopic member 38. As the hygroscopic member 38 expands it pushes piston 34 upwardly compressing the coil spring 40 in the process. Since the lower segment of the pin 26 is securely fixed to the piston 34, the upper end of the pin 24 is forced into the bore 26 in the valve seat 28 as illustrated in FIG. 4. The outer diameter of the pin 24 is close to the diameter of the bore 26 so there is minimal or no leakage when the pin 24 is inserted into the bore 26. Thus the flow of water out of the outlet fitting 18 is substantially turned OFF when there is a predetermined amount of excess water in the soil around the flow control valve 10.

Figure 5A:
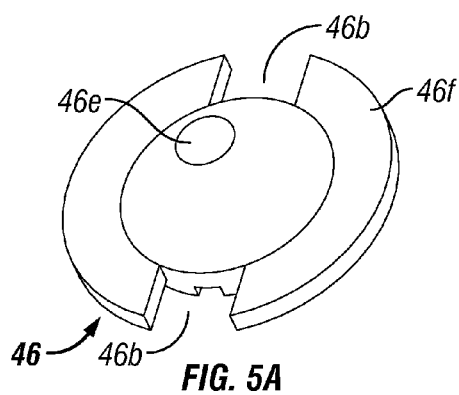
FIG. 5A is an enlarged isometric view of the flow control disc of the flow control valve of FIG. 1 taken from the top side of the disc.
Figure 5C:
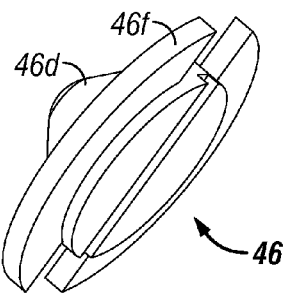
FIG. 5C is another enlarged isometric view of the flow control disc taken from the bottom side of the disc at a different angle than FIG. 5B.
Figure 5B:
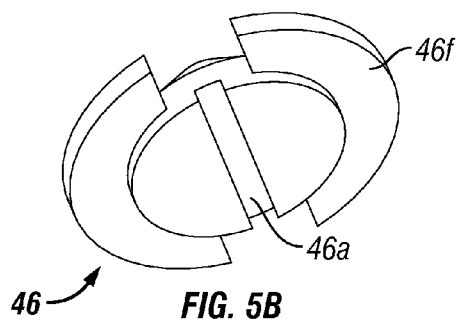
FIG. 5B is an enlarged isometric view of the flow control disc taken from the bottom side of the disc.
Figure 5D:
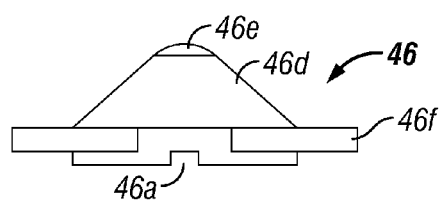
FIG. 5D is an enlarged isometric view of the flow control disc taken from the bottom side of the disc.
Figure 2:
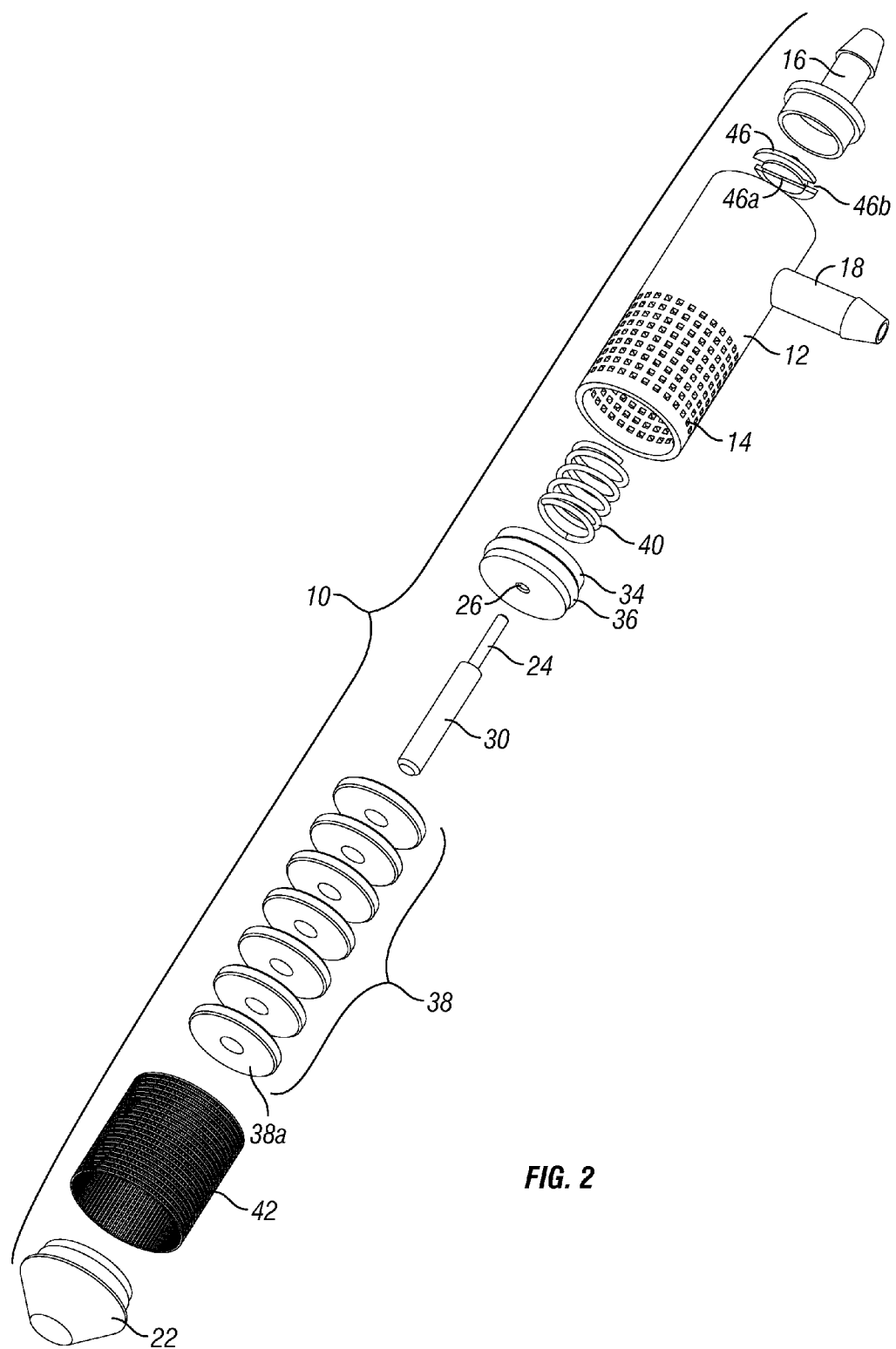
FIG. 2 is an exploded view of the flow control valve of FIG. 1.

The upper end of the housing 12, the upper end cap 20, the valve seat 28 and the pin 24 effectively cooperate to provide a miniature valve that includes a valve chamber 44 (FIG. 3). The valve chamber 44 communicates with the inlet fitting 16 and the bore 26 of the valve seat 28 to define a portion of the flow path through the flow control valve 10. The miniature valve further includes a flow control disc 46 (FIGS. 5A-5D) that is positioned in the valve chamber 44. The flow control disc 46 is preferably molded from silicone rubber. The flow control disc 46 has a diametrically extending flow recess 46a (FIG. 5B) formed on the underside thereof. The side edges of the flow control disc 46 have notches 46b (FIG. 5A) that allow water to enter the flow recess 46a from the chamber 44. The size of the cross-section of the flow recess 46a can be selected to provide a desired flow rate, e.g. one gallon per hour, two gallons per hour, three gallons per hour or four gallons per hour. Different flow control discs can be assembled into the flow control valve 10 to provide the desired flow rate at a nominal pressure of, for example, thirty PSI. The flow control disc 46 is formed with a conical projection 46d (FIG. 5D) with a nipple 46e and a containment ring 46f (FIG. 5C). The lower end of the cylindrical portion 20a of the upper end cap 20 presses down on the periphery of the flexible containment ring 46f to hold it against the upper end of the valve seat 28.

Figure 6:
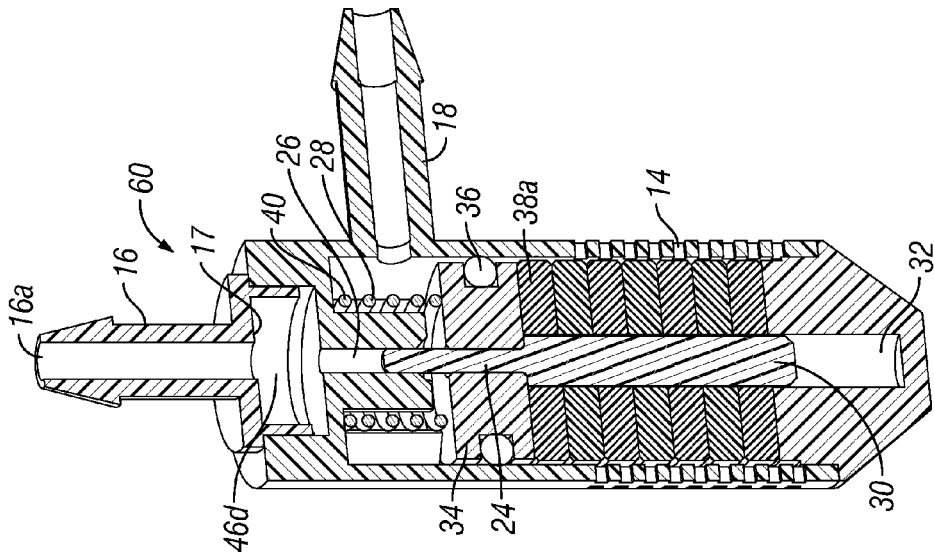
FIG. 6 is a vertical sectional view of an alternate embodiment that functions as a check valve.

FIG. 6 is a vertical sectional view of an alternate embodiment 50 that functions as a check valve. The flow control valve 50 is similar to the flow control valve 10 except that in the flow control valve 50 the containment ring 46f is configured to provide sufficient flexibility to allow the conical projection 46d to be sucked upwardly to seal the bore 16a through the input fitting 16. When the water supply is turned OFF, water may reverse flow though the drip emitter and flow control valve 10 and suck contaminates from the landscape into the drip emitter and valve ports. The increased flexibility of the containment ring 46f in the flow control valve 50 addresses this problem. As the water drains out of the irrigation system it creates a lower pressure on the top of the flow disc 46. This causes the conical projection 46d to raise and seal on the lower shoulder 17 of the input port 16. This check valve function stops the reverse flow or backflow of water through the emitters and the flow control valves 50 to thereby eliminate the flow of debris into the portions of the irrigation system upstream from the emitters and flow control valves 50. This prevents debris from entering the piping of the irrigation system which may plug the micro-irrigation emitters when the system is turned back ON.

Figure 7:
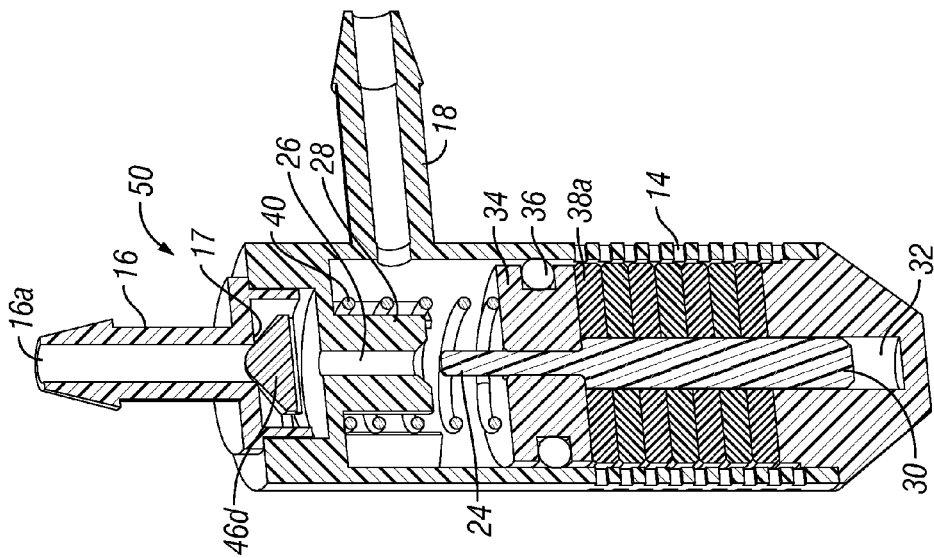
FIG. 7 is a vertical sectional view of an alternate embodiment that has no flow control.

FIG. 7 is a vertical sectional view of another alternate embodiment 60 that has no flow control. It is similar to the flow control valve 10 of FIGS. 1-4 except that the flow disc 46 has been removed. By removing the flow disc 46 from the valve, a higher water flow rate is achieved. This may be advantageous if the end user wishes to place a large number of drip emitter downstream of the soil moisture control valve and they do not want the limited flow that would be present with the flow control disc 46.

Figure 8:
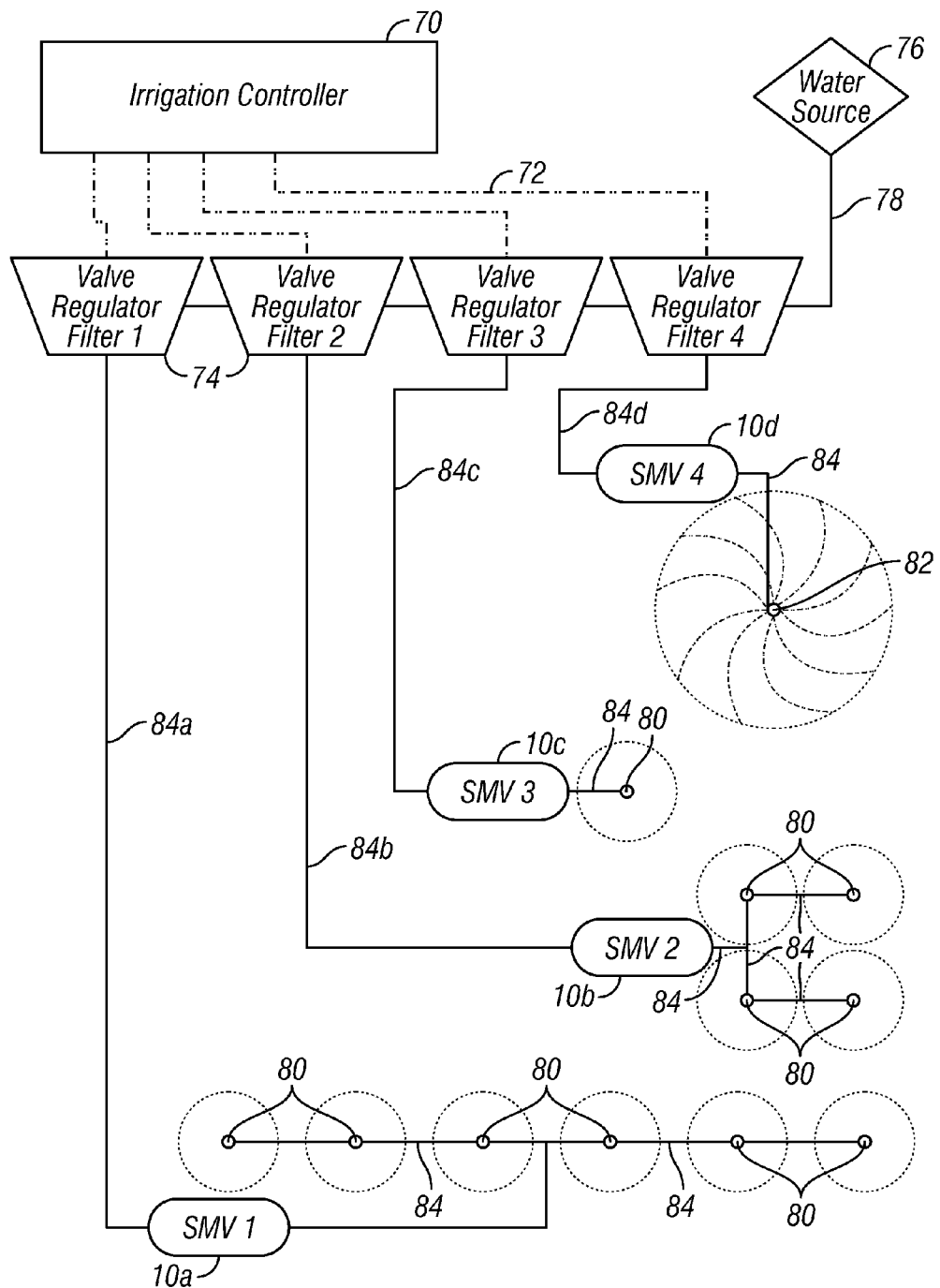
FIG. 8 is a diagrammatic illustration of an irrigation system employing a plurality of solenoid actuated valves and a plurality of flow control valves of the type illustrated in FIGS. 1-4.

FIG. 8 is a diagrammatic illustration of an irrigation system employing a plurality of conventional solenoid actuated valves and a plurality of flow control valves of the type illustrated in FIGS. 1-4. More particularly, an irrigation controller 70 such as a HUNTER® Pro-C® modular irrigation controller is electrically connected via dedicated field valve wires 72 to a plurality of corresponding solenoid actuated diaphragm valves 74. The solenoid actuated valves 74 are hydraulically coupled to a—pressurized water source 76 via underground pipes 78. Each of the valves 74 has a micro-filter attached to remove debris that could otherwise clog a plurality of drip emitters 80 and/or a micro-spray nozzle 82 connected to the valves 74 via above-ground drip tubing 84. Each of the solenoid actuated valves 74 also has a pressure regulator attached to reduce the pressure of the water from the water source 76 from seventy PSI for example to a lower level such as twenty-five to thirty PSI that is compatible with the drip emitters 80 and the micro-nozzle 82. Four moisture responsive flow control valves 10*a*, 10*b*, 10*c* and 10*d* of the type illustrated in FIGS. 1-4 are connected in-line with the drip tubing 84 and are buried adjacent respective plants, shrubs and trees illustrated diagrammatically in FIG. 8 by the phantom line circles. In FIG. 8 the acronym SMV stands for "soil moisture valve." Each of the valves 74 and the drip emitters 80 or micro-nozzle 82 connected thereto comprise a separate zone. Each zone is connected to a corresponding segment or branch line 84*a*, 84*b*, 84*c* and 84*d* of drip tubing that connects to a particular one of the solenoid actuated valves 74. During certain seasons or during certain weather patterns, the watering program executed by the irrigation controller 70 may send water to a particular zone even though the zone does not need watering. This is particularly true if the irrigation controller 70 does not have automatic ET adjustment capability. In such a case, the flow control valve(s) 10*a*, 10*b*, 10*c* and 10*d* for the saturated zone(s) will close or turn OFF and prevent further watering of that zone until the soil dries out sufficiently to allow the hygroscopic element(s) 38 to dry out and contract sufficiently to re-open or turn ON the corresponding the flow control valve(s) 10*a*, 10*b*, 10*c* and 10*d*. Substantial water savings are thereby achieved.

The soil moisture responsive irrigation flow control valve 10 typically shuts of water flow completely, however absolute sealing in each of the flow control valves 10*a*, 10*b*, 10*c* and 10*d* is not necessary because once the irrigation controller 70 turns the lone solenoid actuated valve 74 OFF, water stops flowing to the drip emitters 80 and micro-nozzle 82 from the pressurized water source 76. If there is any leakage from flow control valves 10*a*, 10*b*, 10*c* and 10*d* in while in their closed states when the lone solenoid actuated valve 74 is ON, it will be minimal, e.g. a few drops per hour, which is not significant considering the substantial water savings achieved via the present invention.

Figure 9:
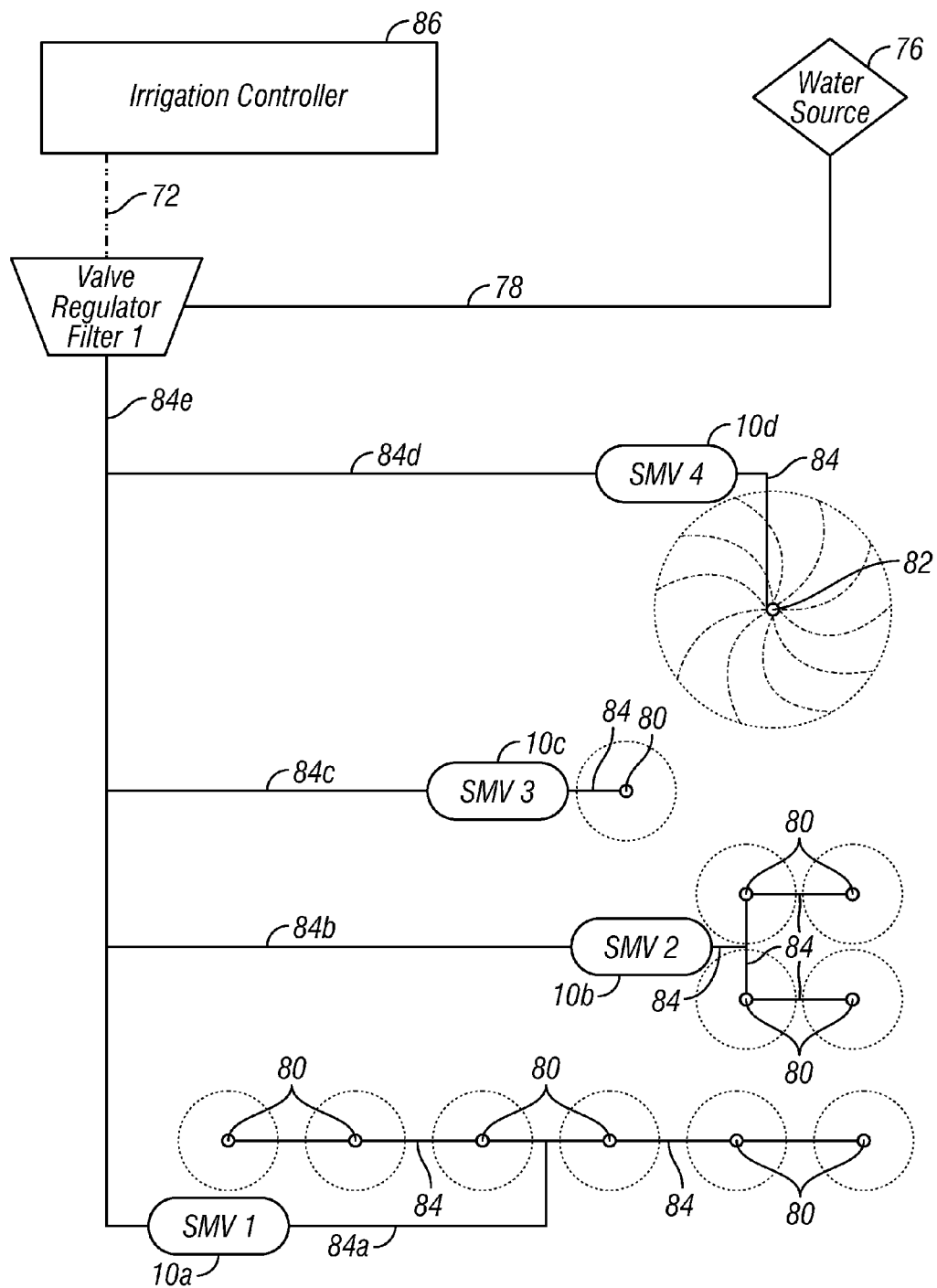
FIG. 9 is a diagrammatic illustration of an irrigation system employing a single solenoid actuated valve and a plurality of flow control valves of the type illustrated in FIGS. 1-4.

FIG. 9 is a diagrammatic illustration of an irrigation system similar to that of FIG. 8 except that the former only employs a single solenoid actuated valve 74. The four flow control valves 10*a*, 10*b*, 10*c* and 10*d* are connected to the lone solenoid actuated valve 74 via drip tubing 84. Thus in the system of FIG. 9 includes a plurality of sets of drip emitters, each set of drip emitters being connected to a corresponding one of a plurality of branch lines 84*a*, 84*b*, 84*c* and 84*d* of drip tubing, each branch line being connected to the lone solenoid actuated valve 74 via a common segment 84*e* of drip tubing. Since the micro-nozzle 82 and the drip emitters 80 are all connected down stream from the lone solenoid actuated valve 74 the system can continue to water some zones even though other zones may have stopped watering due to shut-off of their respective flow control valves 10*a*, 10*b*, 10*c* or 10*d*. The system of FIG. 9 requires only a single solenoid actuated valve 74 with its associated pressure regulator and micro-screen, and therefore this system configuration achieves substantial cost savings over the system of FIG. 8. In addition, because the system of FIG. 9 only has a single solenoid actuated valve 74, the irrigation controller 86 can be much simpler in design and less inexpensive than the irrigation controller employed in the system of FIG. 8. The flow control valves 10*a*, 10*b*, 10*c* and 10*d* effectively divide the system into zones. The watering program executed by the irrigation controller 86 can be very simple, such as three hours ON once per week. Each zone will get only the water it needs to maintain the health of the plants, shrubs and trees in the zones.

While a preferred embodiment of a soil moisture responsive irrigation flow control valve in accordance with the present invention has been described in detail, along with several modifications thereof, further modifications will occur to those skilled in the art. Therefore the protection afforded the present invention should only be limited in accordance with the scope of the following claims.

What is claimed is:

1. A soil moisture responsive irrigation flow control valve, comprising:
   a housing having at least one port for allowing entry of subterranean water into an interior of the housing when the housing is buried in soil and having an inlet fitting configured to be coupled to drip tubing for receiving water conveyed from a pressurized water source through the tubing and an outlet for discharging water to the soil;
   a valve including a valve member movable to open and close a fluid communication path between the inlet and the outlet;
   a hygroscopic member positioned in the interior of the housing capable of absorbing subterranean water and expanding to move the valve member to close the fluid communication path;
   a spring element positioned to bias the valve member to open the fluid communication path;
   a valve chamber that communicates with the inlet and a valve seat; and
   a flow control member positioned in the valve chamber.

2. The valve of claim 1 wherein the valve member is configured in the shape of a pin.

3. The valve of claim 1 wherein the hygroscopic member includes a plurality of discs made of a hygroscopic material.

4. The valve of claim 1 wherein the spring element is a coil spring.

5. The valve of claim 1 and further comprising a filter screen covering the port.

6. The valve of claim 1 wherein the housing is cylindrical and has a plurality of ports and the valve further comprises a cylindrical filter screen surrounding the housing and covering the ports.

7. The valve of claim 1 wherein the valve is configured to fail in a normally open condition.

8. The valve of claim 1 wherein the outlet is a barbed fitting.

9. The valve of claim 1 wherein the inlet fitting is a barbed fitting.

10. The valve of claim 1 wherein the flow control member is a disc that has a flow recess.

11. A soil moisture responsive irrigation flow control valve, comprising:
    a housing having at least one port for allowing entry of subterranean water into an interior of the housing when the housing is buried in soil and having an inlet fitting configured to be coupled to drip tubing for receiving water from a pressurized water source conveyed through the tubing and an outlet for discharging water;

a valve including a valve member movable to open and close a fluid communication path between the inlet and the outlet;

a hygroscopic member including a plurality of discs made of a hygroscopic material positioned in the interior of the housing capable of absorbing subterranean water and expanding to move the valve member to close the fluid communication path;

a spring element positioned to bias the valve member to open the fluid communication path;

a valve chamber that communicates with the inlet and a valve seat; and a flow control member positioned in the valve chamber.

12. The valve of claim 11 wherein the valve member is configured in the shape of a pin.

13. The valve of claim 11 wherein the hygroscopic material is substantially non-biodegradable.

14. The valve of claim 11 wherein the spring element is a coil spring.

15. The valve of claim 11 and further comprising a filter screen covering the port.

16. The valve of claim 11 wherein the housing is cylindrical and has a plurality of ports and the valve further comprises a cylindrical filter screen surrounding the housing and covering the ports.

17. The valve of claim 11 wherein the valve is configured to fail in a normally open condition.

18. The valve of claim 11 wherein the outlet is a barbed fitting.

19. The valve of claim 11 wherein the inlet fitting is a barbed fitting.

20. A soil moisture responsive irrigation flow control valve, comprising:

an elongate housing with an axis and having a plurality of ports formed in a side wall of the hosing for allowing entry of subterranean water into an interior of the housing when the housing is buried in soil;

an inlet fitting that communicates with the interior of the housing and is configured to be coupled to a first segment of drip tubing and receiving water from a pressurized water source conveyed through the first segment of tubing;

an outlet fitting that communicates with the interior of the housing and is configured to be coupled to a second segment of drip tubing for discharging water;

a valve mounted in the housing and including a valve chamber and a valve member configured as a pin movable to open and close a bore in a valve seat located in the housing, the bore forming a portion of fluid communication path between the inlet fitting and the outlet fitting;

a piston mounted for reciprocal axial motion within the housing toward and away from the valve seat and secured to a lower segment of the pin;

a guide shaft having an upper end connected to a lower segment of the pin and having a lower end reciprocable in an axially extending bore formed in a structure located at a lower end of the housing;

a hygroscopic member including a plurality of discs surrounding an upper segment of the guide shaft beneath the piston, the discs being made of a hygroscopic material capable of absorbing subterranean water and expanding so that axial expansion of the hygroscopic member due to subterranean water entering the housing through the ports is sufficient to move the valve member to move the pin into the bore of the valve seat to substantially close the fluid communication path; and a coil spring element positioned inside the housing between the piston and the valve seat to bias the piston away from the valve seat to move the pin out of the bore in the valve seat and thereby open the fluid communication path when the hygroscopic discs dry out a sufficient amount.

* * * * *